(12) United States Patent
Horiuchi et al.

(10) Patent No.: US 8,303,031 B2
(45) Date of Patent: Nov. 6, 2012

(54) SUNROOF DEVICE

(75) Inventors: Shigehito Horiuchi, Sakura (JP); Ryosuke Noro, Sakura (JP)

(73) Assignee: Yachiyo Industry Co., Ltd., Sayama-shi (JP)

( * ) Notice: Subject to any disclaimer, the term of this patent is extended or adjusted under 35 U.S.C. 154(b) by 245 days.

(21) Appl. No.: 12/793,941

(22) Filed: Jun. 4, 2010

(65) Prior Publication Data

US 2010/0308627 A1 Dec. 9, 2010

(30) Foreign Application Priority Data

Jun. 5, 2009 (JP) ................................. 2009-136017
Apr. 15, 2010 (JP) ................................. 2010-094222

(51) Int. Cl.
*B60J 7/043* (2006.01)
*B60J 1/20* (2006.01)

(52) U.S. Cl. ....................................... 296/214; 296/223
(58) Field of Classification Search .................. 296/214, 296/223

See application file for complete search history.

(56) References Cited

U.S. PATENT DOCUMENTS

| 5,250,882 | A | * | 10/1993 | Odoi et al. | .................... | 318/467 |
| 5,372,401 | A | * | 12/1994 | Odoi et al. | .................... | 296/214 |
| 5,951,100 | A | * | 9/1999 | Ewing et al. | .................. | 296/214 |
| 7,281,758 | B2 | * | 10/2007 | Fuchs et al. | ................... | 296/214 |

FOREIGN PATENT DOCUMENTS

JP      05-004521      1/1993

* cited by examiner

*Primary Examiner* — Dennis Pedder
(74) *Attorney, Agent, or Firm* — Rankin, Hill & Clark LLP

(57) ABSTRACT

There is provided a sunroof device which can suppress any forgetfulness of closing of a roof panel through a simple switch manipulation when a shade panel is closed. The sunroof device has the roof panel which is driven by a roof-panel motor and is opened/closed in accordance with a manipulation of a roof-panel opening/closing switch, and the shade panel which is driven by a shade-panel motor and is opened/closed in accordance with a manipulation of a shade panel opening/closing switch. The roof-panel motor is driven together with the shade-panel motor to actuate the roof panel in the closed direction interlocking with the shade panel upon the shade-panel opening/closing switch receiving a manipulation input in the closed direction in a condition other than a condition in which both roof panel and shade panel are fully closed, and the roof panel is fully closed upon the shade panel becoming fully closed.

4 Claims, 5 Drawing Sheets

FIG.2A  FULLY-CLOSED POSITION
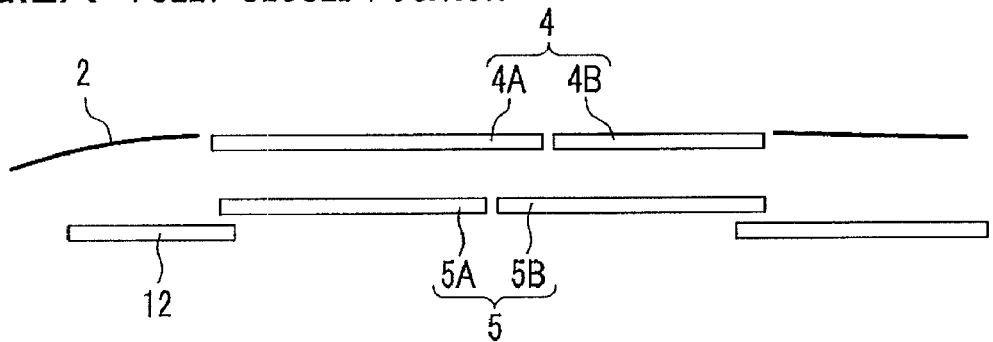
FIG.2B  TILT POSITION
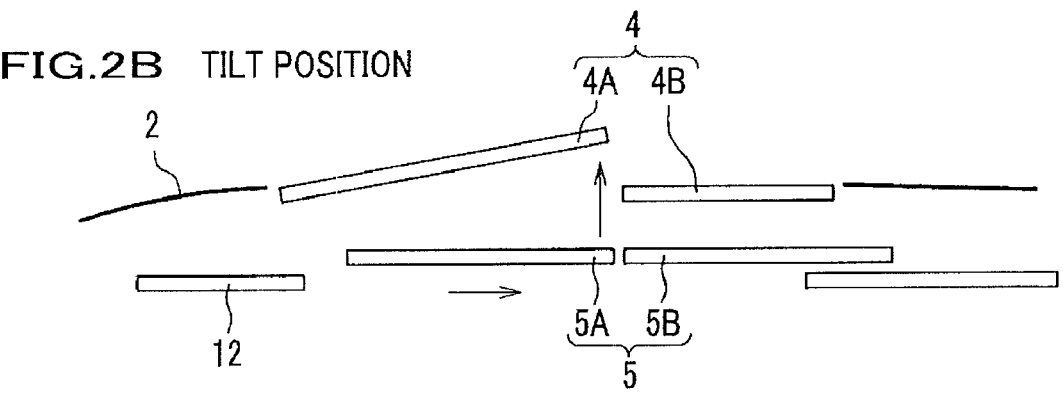
FIG.2C  HALF-OPENED POSITION
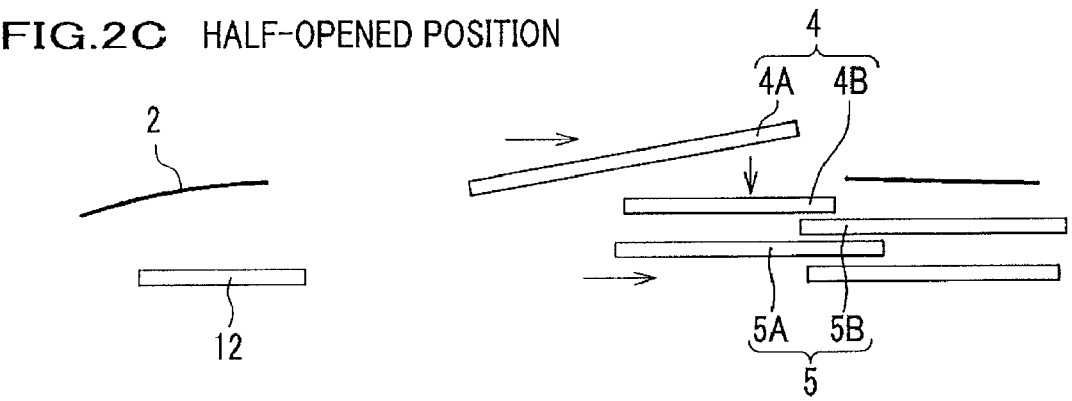
FIG.2D  FULLY-OPENED POSITION
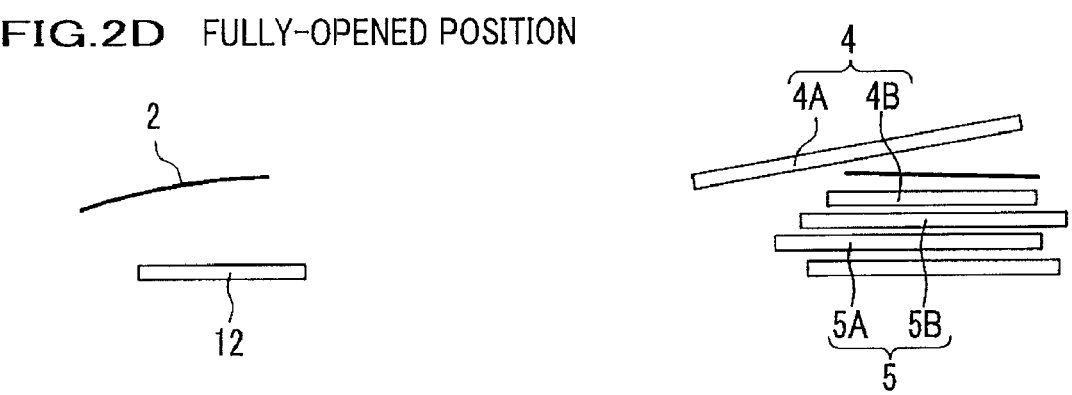

FIG.5A  SHADE FULLY OPENED
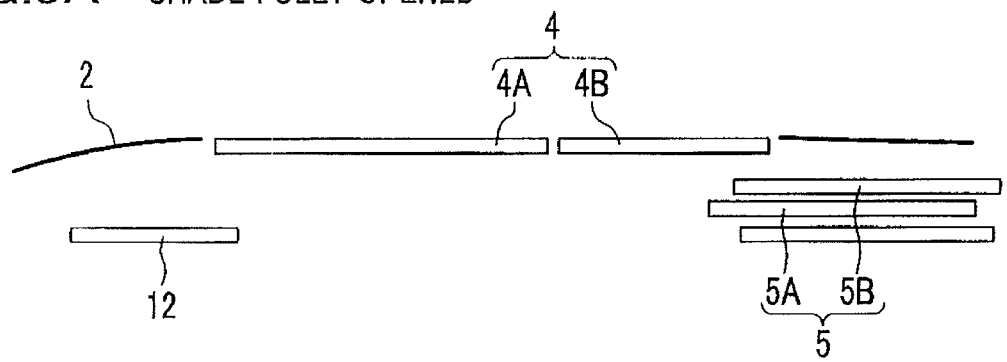
FIG.5B  SHADE HALF OPENED
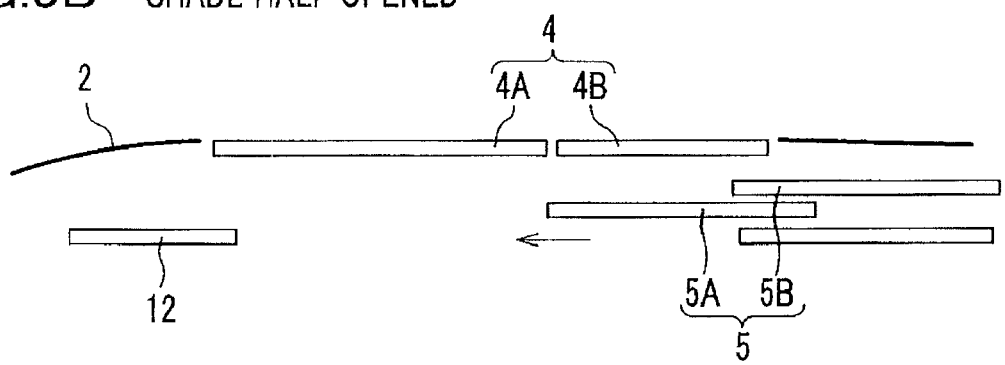
FIG.5C  SHADE FULLY CLOSED
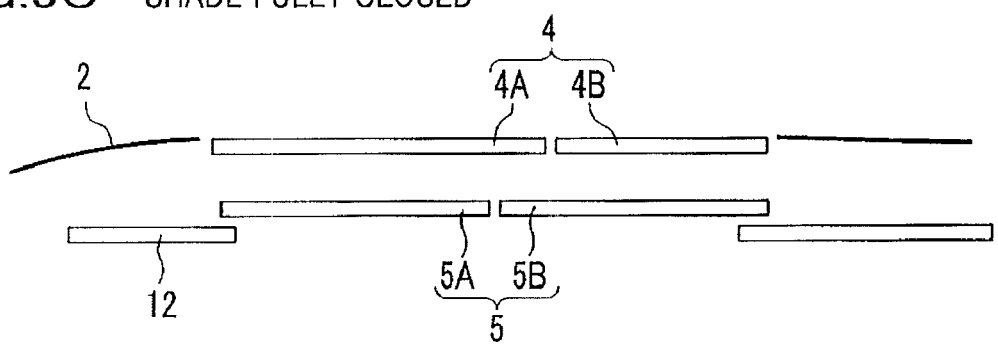

SUNROOF DEVICE

CROSS REFERENCE TO RELATED APPLICATIONS

This application claims the foreign priority benefit under 35 U.S.C. §119 of Japanese Patent Application No. 2010-094222 filed on Apr. 15, 2010 and Japanese Patent Application No. 2009-136017 filed on Jun. 5, 2009, the disclosure of which is incorporated herein by reference.

BACKGROUND OF THE INVENTION

1. Field of the Invention

The present invention relates to a sunroof device comprising a roof panel which opens/closes an opened part of a fixed roof of a vehicle and a shade panel.

2. Description of the Related Art

Conventional sunroof devices often have an electrically-opened/closed roof panel, but have a manually-opened/closed shade panel. In recent days, however, respective opening/closing strokes of those panels tend to extend toward the rear side of a vehicle along with increase in size of the opened part. This brings in a new problem that a person experiences difficulty in reaching around the rear end of the stroke according to the manual operation of opening and closing the panels by raising his/her hand in a sitting posture.

Conversely, Japan Patent No. 3339695 discloses a sunroof device comprising an electrically-operated shade panel. This patent literature discloses a technology of restricting an actuation of the shade panel in a closed direction when a person manipulates a shade-panel opening/closing switch in the closed direction with the roof panel being opened, in addition to a technology of actuating the shade panel in an open direction electrically interlocked with the motion of the roof panel in the open direction. This patent literature discloses that according to the former technology, it becomes possible to suppress any forgetfulness of closing of the roof panel when the shade panel is closed.

SUMMARY OF THE INVENTION

The former technology of the foregoing patent literature forcibly invalidates the manipulation of the shade-panel opening/closing switch. Complete unresponsiveness of the shade panel even though a person on the vehicle manipulates the switch to attempt to close the shade panel often causes the person who does not get used to such restriction function to feel strangeness. According to this technology, in order to close the shade panel with the roof panel being opened, first, it is necessary to manipulate a roof-panel opening/closing switch to close the roof panel, and then to manipulate the shade-panel opening/closing switch to close the shade panel. Such operation increases the number of switch manipulations, resulting in a poor user-friendliness.

The present invention has been made in order to overcome the foregoing problem, and it is an object of the present invention to provide a sunroof device which can suppress any forgetfulness of closing of the roof panel through a simple switch manipulation when the shade panel is closed.

In order to overcome the foregoing problem, the present invention provides a sunroof device including: a roof panel which opens/closes an opened part of a fixed roof of a vehicle; and a shade panel, wherein the roof panel is driven by a roof-panel motor and is opened/closed in accordance with a manipulation of a roof-panel opening/closing switch, and the shade panel is driven by a shade-panel motor and is opened/closed in accordance with a manipulation of a shade-panel opening/closing switch, and the sunroof device further comprises a closed-direction interlocking unit that causes the roof-panel motor to be actuated together with the shade-panel motor to drive the roof panel in a closed direction interlocking with the shade panel upon the shade-panel opening/closing switch receiving a manipulation input in the closed direction in a condition other than a condition in which both roof panel and shade panel are fully closed, and the closed-direction interlocking unit also causes the roof panel to be fully closed upon the shade panel becoming fully closed.

According to the configuration including the closed-direction interlocking unit, the roof panel is automatically fully closed upon the shade panel becoming fully closed, thereby suppressing any forgetfulness of closing of the roof panel. The roof panel is closed through only a manipulation of the shade-panel opening/closing switch without manipulation of both shade-panel opening/closing switch and roof-panel opening/closing switch. Therefore, the user-friendliness of the switch manipulation also improves.

Moreover, the shade-panel opening/closing switch of the present invention has a manual closing operation mode and an automatic closing operation mode, and the closed-direction interlocking unit is applied to both modes.

The closed-direction interlocking unit is applied to both manual closing operation mode and automatic closing operation mode, thereby surely suppressing any forgetfulness of closing of the roof panel.

According to the present invention, it becomes possible to suppress any forgetfulness of closing of the roof panel through a simple switch manipulation when the shade panel is closed.

BRIEF DESCRIPTION OF THE DRAWINGS

FIGS. 2A to 2D are side views for explaining an operation of the sunroof device according to the present invention;

FIGS. 5A to 5C are side views showing how the shade panel alone is opened/closed with the roof panel being fully closed.

DETAILED DESCRIPTION OF THE PREFERRED EMBODIMENT

Figure 1:
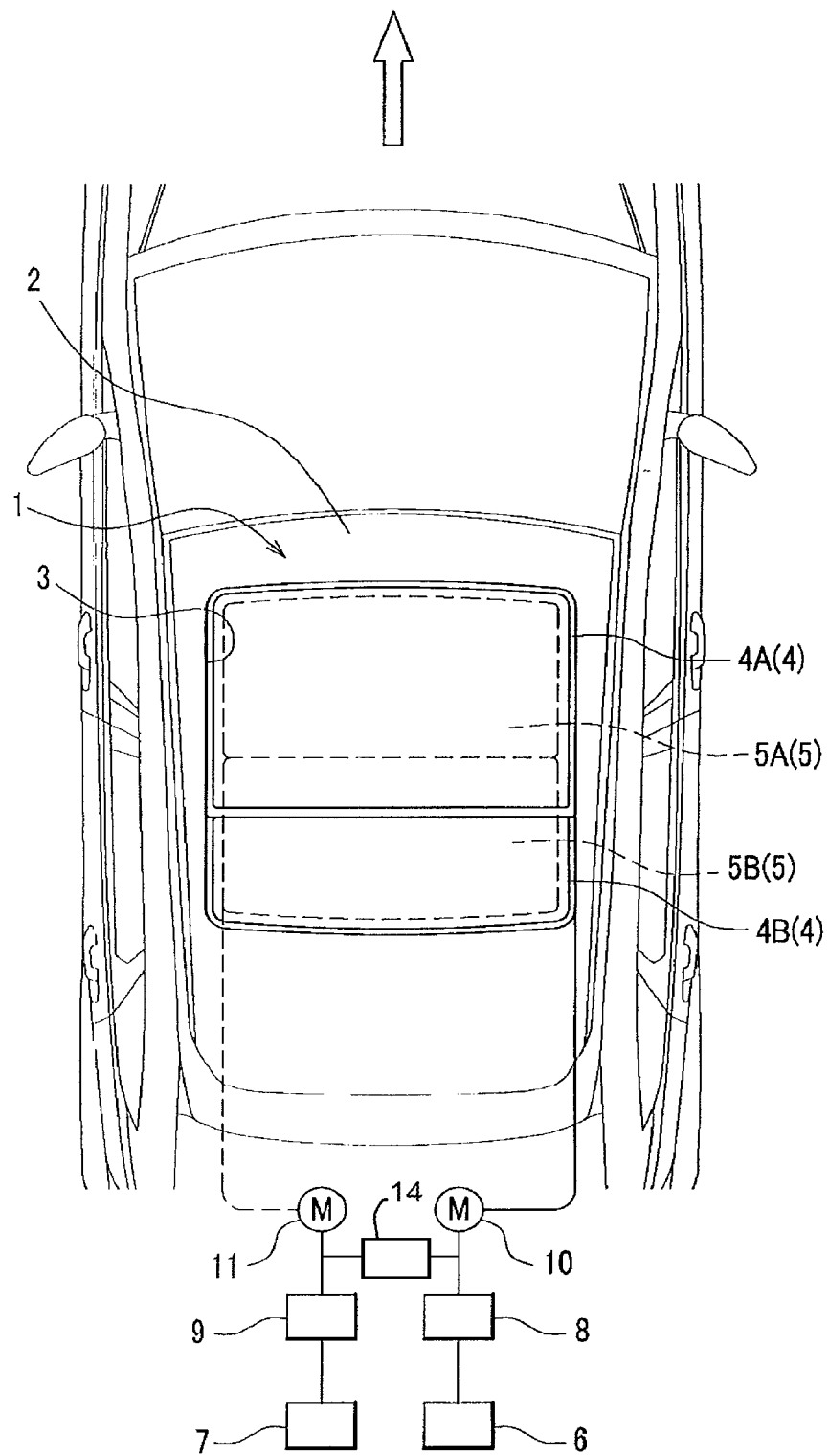
FIG. 1 is a plan view showing a sunroof device according to the present invention.

An explanation will be given of an example case in which a sunroof device comprises a roof panel and a shade panel each divided into plural pieces in the front-rear direction of a vehicle. As shown in FIG. 1 and FIGS. 2A to 2D, a sunroof device 1 comprises a front roof panel 4A and a rear roof panel 4B which function as a roof panel 4 together that opens/closes an opened part 3 of a fixed roof 2 and a front shade panel 5A and a rear shade panel 5B which function as a shade panel 5 together and which are located downwardly of the roof panel. A reference numeral 12 in FIG. 2 denotes a roof lining configuring an internal ceiling of the vehicle.

In FIG. 1, the front roof panel 4A and the rear roof panel 4B are driven by a roof-panel motor 10 and are opened/closed in accordance with a manipulation of a roof-panel opening/closing switch 6. The front shade panel 5A and the rear shade panel 5B are driven by a shade-panel motor 11 and are opened/closed in accordance with a manipulation of a shade-panel opening/closing switch 7. A roof-panel-motor control circuit 8 which controls the drive of the roof-panel motor 10 in accordance with a manipulation input from the roof-panel opening/closing switch 6 is provided between the roof-panel opening/closing switch 6 and the roof-panel motor 10. Further, a shade-panel-motor control circuit 9 which controls the drive of the shade-panel motor 11 in accordance with a manipulation input from the shade-panel opening/closing switch 7 is provided between the shade-panel opening/closing switch 7 and the shade-panel motor 11.

FIG. 2A shows a condition in which the roof panel 4 and the shade panel 5 are both fully closed, and FIG. 2B shows a condition in which the front roof panel 4A is tilted up from the condition in FIG. 2A. The front shade panel 5A slightly opens backwardly interlocking with a tilt-up operation of the front roof panel 4A, thereby ventilating the interior of the vehicle. Note that a position of the roof panel 4 in the condition shown in FIG. 2A is called a "fully-closed position", and a position of the roof panel 4 in the condition shown in FIG. 2B is called a "tilt position".

FIG. 2C shows a condition in which the tilted-up front roof panel 4A is slid backwardly from the condition in FIG. 2B, and has reached a rear end of an opening/closing stroke thereof within a range not accompanying a sliding of the rear roof panel 4B. The rear roof panel 4B is lifted down from the fixed roof 2, but has not been yet slid. During this operation, the front shade panel 5A and the rear shade panel 5B are also slid backwardly interlocking with the front roof panel 4A. The rear shade panel 5B moves upwardly at a retaining part formed between the fixed roof 2 and the roof lining 12, and the front shade panel 5A is retained below the rear shade panel 5B. Note that a position of the roof panel 4 in the condition in FIG. 2C is called a "half-opened position".

FIG. 2D shows a condition in which the front roof panel 4A and the rear roof panel 4B are both slid together from the condition in FIG. 2C, and have reached a rearmost end of the opening/closing stroke. During this operation, the front shade panel 5A and the rear shade panel 5B are also slid backwardly interlocking with the motion of the front roof panel 4A and that of the rear roof panel 4B. The rear roof panel 4B, the front shade panel 5A and the rear shade panel 5B are retained in the retaining part between the fixed roof 2 and the roof lining 12. Note that a position of the roof panel 4 in the condition shown in FIG. 2D is called a "fully-opened position".

Figure 3A:
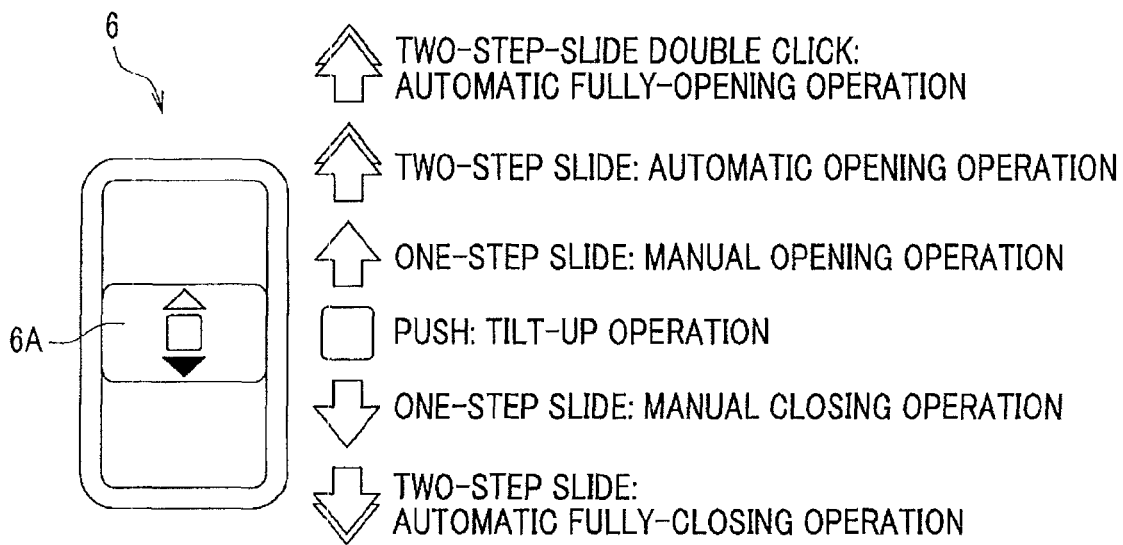
FIG. 3A is a front view showing a roof-panel opening/closing switch.

In FIG. 3A, the roof-panel opening/closing switch 6 has a switch 6A slidable in both directions from a center position by a manipulation input by a finger of a person on the vehicle. When a finger is released from the switch 6A, the switch 6A returns to the center position. The roof-panel opening/closing switch 6 has a manual mode in which the roof panel 4 is being opened/closed while the switch 6A keeps receiving a manipulation input by a finger, and an automatic mode in which the roof panel 4 is automatically opened/closed even if the finger is released from the switch 6A.

Examples of the specification of the roof-panel opening/closing switch 6 are as follows:

(a) <push: a tilt-up operation>

When the switch 6A at the center position is pressed, the roof panel 4 is moved to the "tilt position" in FIG. 2B.

(b) <one-direction and one-step slide: a manual opening operation>

When the switch 6A is slid by one step in one direction and while the switch 6A is being maintained at that slide position by a finger, the roof panel 4 is opened.

(c) <one-direction and two-step slide: an automatic opening operation>

When the switch 6A is slid by two steps in one direction as a first manipulation input, the roof panel 4 is moved to the "half-opened position" in FIG. 2C. When the switch 6A is slid again by two steps in one direction as a second manipulation input, the roof panel 4 is moved to the "fully-opened position" in FIG. 2D.

(d) <one-direction and two-step-slide double click: an automatic fully-opening operation>

When the switch 6A is subjected to double-click in one-direction to a slide position by what corresponds to two steps, the roof panel 4 is moved to the "fully-opened position" in FIG. 2D without stopping at the "half-opened position".

(e) <the other-direction and one-step slide: a manual closing operation>

When the switch 6A is slid by one step in the other direction and while the switch 6A is being maintained at that slide position by a finger, the roof panel 4 is closed.

(f) <the other-direction and two-step slide: an automatic fully-closing operation>

When the switch 6A is slid by two steps in the other direction, the roof panel 4 is moved to the "fully-closed position" in FIG. 2A. When the roof panel 4 is opened beyond the "half-opened position", the roof panel 4 is moved to the "fully-closed position" in FIG. 2A without once stopping at the "half-opened position".

Figure 3B:
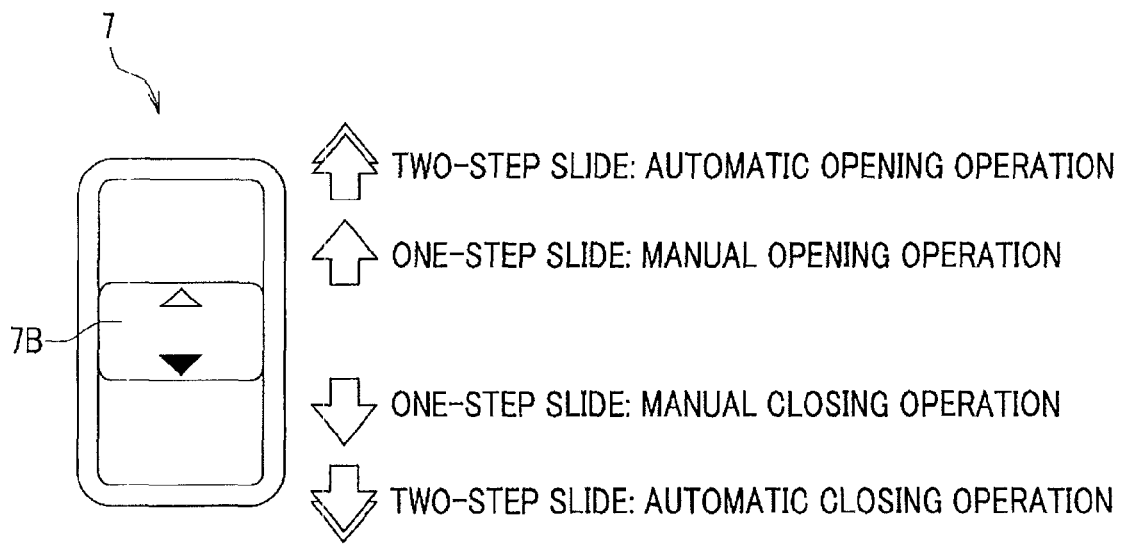
FIG. 3B is a front view showing a shade-panel opening/closing switch.

Next, in FIG. 3B, like the roof-panel opening/closing switch 6, the shade-panel opening/closing switch 7 also has a switch 7A slidable in both directions from a center position by a manipulation input by a finger of the person on the vehicle. The switch 7A also returns to the center position when a finger is released from the switch 7A. The shade-panel opening/closing switch 7 has a manual mode in which the shade panel 5 is being opened/closed while the switch 7A keeps receiving a manipulation input by a finger, and an automatic mode in which the shade panel 5 is automatically opened/closed even if the finger is released from the switch 7A.

Examples of the specification of the shade-panel opening/closing switch 7 are follows:

(g) <one-direction and one-step slide: a manual opening operation>

When the switch 7A is slid by one step in one direction and while the switch 7A is being maintained at that slide position by a finger, the shade panel 5 is opened.

(h) <one-direction and two-step slide: an automatic opening operation>

When the switch 7A is slid by two steps in one direction, the shade panel 5 is opened until becoming the condition in FIG. 2D.

(i) <the other-direction and one-step slide: a manual closing operation>

When the switch 7A is slid by one step in the other direction and while the switch 7A is being maintained at that slide position by a finger, the shade panel 5 is closed.

(j) <the other-direction and two-step slide: an automatic closing operation>

When the switch 7A is slid by two steps in the other direction, the shade panel 5 is closed to the condition shown in FIG. 2A.

With the foregoing configuration, the sunroof device 1 of the present invention comprises closed-direction interlocking unit 14 that causes the roof-panel motor 10 to be actuated together with the shade-panel motor 11 to drive the roof panel 4 in a closed direction interlocking with the shade panel 5 upon the shade panel opening/closing switch 7 receiving a manipulation input in the closed direction in a condition other than a condition in which the roof panel 4 and the shade panel 5 are both fully closed, i.e., a condition in which the roof panel 4 and the shade panel 5 are both opened including the tilt-up of the roof panel 4, and the closed-direction interlocking unit 14 also causes the roof panel 4 to be fully closed if the shade panel 5 becomes to be fully closed.

Figure 4:
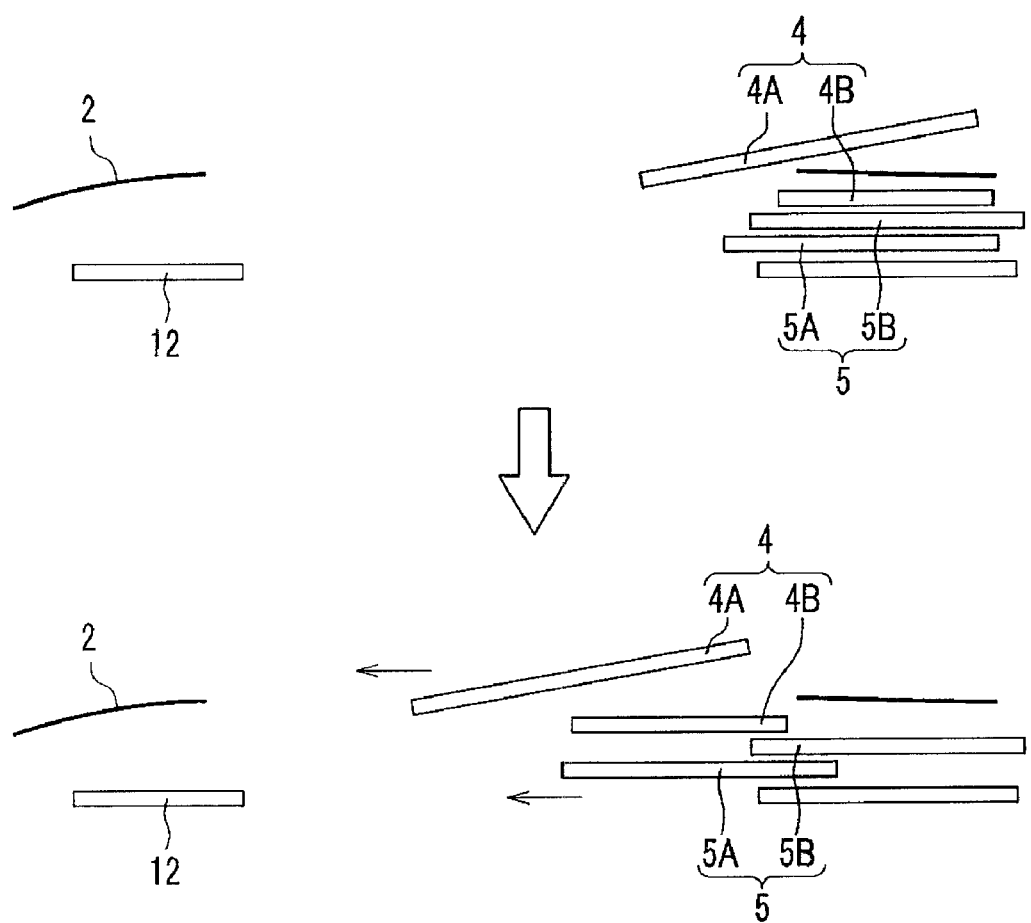
FIG. 4 is a side view showing how a roof panel is also closed interlocking with a motion of a shade panel.

For example, as shown in an upper part of FIG. 4, when the roof panel 4 and the shade panel 5 are both fully opened, if the shade-panel opening/closing switch 7 receives a manipulation input in the closed direction, as shown in a lower part of FIG. 4, the roof panel 4 is also closed together with the shade panel 5. Moreover, in the conditions shown in FIG. 2B and in FIG. 2C, if the shade-panel opening/closing switch 7 receives a manipulation input in the closed direction, the roof panel 4 is also closed together with the shade panel 5.

Technically in an electrical circuit, for example, when the shade-panel opening/closing switch 7 receives a manipulation input in the closed direction, the shade-panel-motor control circuit 9 transmits a trigger signal or the like for rotating and driving the roof-panel motor 10 in the closed direction to the roof-panel-motor control circuit 8.

According to the configuration including the above-explained closed-direction interlocking unit, the roof panel 4 becomes fully closed when the shade panel 5 becomes fully closed, so that it does not happen that a person unthinkingly closes only the shade panel 5 and forgets to close the roof panel 4 which becomes invisible from the interior of the vehicle because of closing of the shade panel 5. The roof panel 4 is closed through only a manipulation of the shade-panel opening/closing switch 7, unlike Japan Patent No. 3339695 which requires manipulation of both shade-panel opening/closing switch and roof-panel opening/closing switch. Therefore, the user-friendliness of the switch manipulation also improves.

The shade-panel opening/closing switch 7 has the above-explained two modes with respect to a manipulation input in the closed direction: (i) the manual closing operation; and (j) the automatic closing operation. Regarding the manual closing operation of (i), such operation may he regarded as a total manual operation, and only the shade panel 5 may be closed without causing the roof panel 4 to interlock with the closing operation of the shade panel 5 at all, and the closed-direction interlocking unit may be applied to only the automatic closing operation mode of (j). This is because as a manipulation of the shade panel 5 by a person on the vehicle, in general, the person is more like to use the manual closing operation mode when slightly adjusting opening/closing of the shade panel 5, and to use the automatic closing operation mode when completely closing the shade panel 5.

However, because the shade panel 5 can be fully closed in the manual closing operation mode, too, it is desirable that the closed-direction interlocking means should be applied to both manual closing operation mode and automatic closing operation mode.

Moreover, in the present invention, a timing of the roof panel 4 actuated to move in the closed direction while interlocking with the shade panel 5 is not limited to any particular timing, and any timing can be allowed as long as the roof panel 4 becomes fully closed if the shade panel 5 becomes fully closed. That is, in addition to a simultaneous operation of the shade panel 5 and the roof panel 4 in the closed direction, the shade panel 5 may be actuated in the closed direction at first, and then the roof panel 4 may be followingly actuated, or the roof panel 4 may be actuated in the closed direction at first, and then the shade panel 5 may be followingly actuated. Alternatively, those operations may be combined together, and for example, when the open level of the shade panel 5 is larger than that of the roof panel 4, the shade panel 5 may be actuated in the closed direction at first, and conversely, when the open level of the roof panel 4 is larger than that of the shade panel 5, the roof panel 4 may be actuated in the closed direction at first. In this case, respective positions of the panels can be easily deduced by detecting a rotation angle of the roof-panel motor 10 and that of the shade-panel motor 11.

Moreover, when the closed-direction interlocking unit is also applied to the manual closing operation mode, if it is desirable to accomplish a specification of actuating only the shade panel 5 through a manual manipulation as much as possible, the actuation of the roof panel 4 in the closed direction may be started after the shade panel 5 becomes fully closed. Furthermore, as shown in FIG. 2A, when the shade panel 5 is closed with a front edge of the shade panel 5 (5A) overlapping the roof lining 12, the actuation of the roof panel 4 in the closed direction may be started after the shade panel 5 becomes overlapping the roof lining 12. In this case, it is desirable that the actuation of the roof panel 4 in the closed direction should be started within a few seconds (e.g., within 3 seconds) at the latest after the shade panel 5 becomes fully closed, or after the shade panel 5 becomes overlapping the roof lining 12. Accordingly, merely the shade panel 5 can be freely adjusted and opened/closed without any actuation of the roof panel 4 until the shade panel 5 becomes substantially fully closed.

The explanation has been given of the sunroof device 1 comprising the roof panel 4 and the shade panel 5 each divided into the plural pieces in the front-rear direction of the vehicle, but the present invention can be also applicable to a sunroof device having single roof panel and single shade panel.

FIG. 5A to FIG. 5C respectively show the shade panel 5 in a fully-opened condition, in a half-opened condition and in a fully-closed condition with the roof panel 4 being fully closed. When the roof panel 4 is fully closed, even if the shade panel 5 is opened/closed in either mode of the manual mode or the automatic mode through a manipulation of the shade-panel opening/closing switch 7 (FIG. 3B), the roof panel 4 is not actuated interlocking with the shade panel 5. Accordingly, merely the shade panel 5 can be actuated in the closed direction from FIG. 5A, FIG. 5B to FIG. 5C in this order, and in an open direction from FIG. 5C, FIG. 5B to FIG. 5A in this order.

What is claimed is:

1. A sunroof device comprising:
   a roof panel which opens/closes an opened part of a fixed roof of a vehicle; and
   a shade panel which opens/closes the opened part of the fixed roof of the vehicle, wherein
   the roof panel is driven by a roof-panel motor and is opened/closed in accordance with a manipulation of a roof-panel opening/closing switch, and the shade panel is driven by a shade-panel motor and is opened/closed in accordance with a manipulation of a shade-panel opening/closing switch, said shade-panel opening/closing switch being separate from said roof-panel opening/closing switch such that said shade-panel opening/closing switch and said roof-panel opening/closing switch are operable independent of one another;
   the sunroof device further comprises a closed-direction interlocking unit that causes the roof-panel motor to be actuated together with the shade-panel motor to drive the roof panel in a closed direction interlocking with the shade panel when the shade-panel opening/closing switch receives a manipulation input in the closed direction in a condition other than a condition in which both of the roof panel and the shade panel are fully closed, the closed-direction interlocking unit also causes the roof panel to be fully closed upon the shade panel becoming fully closed, the shade-panel opening/closing switch has a manual closing operation mode, the closed-direction interlocking unit is applied to the manual closing operation mode, and in the manual closing operation mode an actuation of the roof panel in the closed direction starts after the shade panel becomes fully closed.

2. A sunroof device comprising:

a roof panel that opens/closes an opened part of a fixed roof of a vehicle; and, a shade panel that opens/closes the opened part of the fixed roof of the vehicle, wherein:

the roof panel is driven by a roof-panel motor and is opened/closed in accordance with a manipulation of a roof-panel opening/closing switch, and the shade panel is driven by a shade-panel motor and is opened/closed in accordance with a manipulation of a shade-panel opening/closing switch, said shade-panel opening/closing switch being separate from said roof-panel opening/closing switch such that said shade-panel opening/closing switch and said roof-panel opening/closing switch are operable independent of one another; and the sunroof device further comprises a closed-direction interlocking unit that causes the roof-panel motor to be actuated together with the shade-panel motor to drive the roof panel in a closed direction interlocking with the shade panel when the shade-panel opening/closing switch receives a manipulation input in the closed direction in a condition other than a condition in which both of the roof panel and the shade panel are fully closed, the closed-direction interlocking unit also causes the roof panel to be fully closed upon the shade panel becoming fully closed, the shade-panel opening/closing switch has a manual closing operation mode, the closed-direction interlocking unit is applied to the manual closing operation mode, and the sunroof device employs a structure in which the shade panel is closed with a front edge of the shade panel overlapping a roof lining, in the manual closing operation mode, an actuation of the roof panel in the closed direction starts after the front edge of the shade panel overlaps the roof lining.

3. The sunroof device according to claim 1, wherein the shade-panel opening/closing switch further has an automatic closing operation mode, and the closed-direction interlocking unit is also applied to the automatic closing operation mode.

4. The sunroof device according to claim 2, wherein the shade-panel opening/closing switch further has an automatic closing operation mode, and the closed-direction interlocking unit is also applied to the automatic closing operation mode.

* * * * *